Feb. 16, 1926. 1,572,914
W. P. FLEMING
DRIVE-AWAY TOWING FIXTURE
Filed May 11, 1925
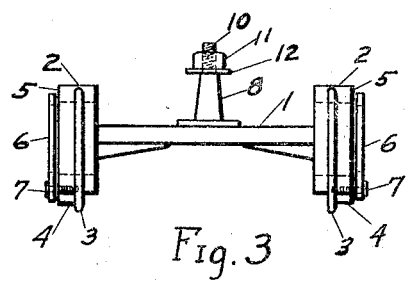
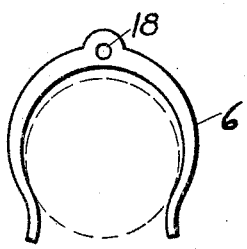
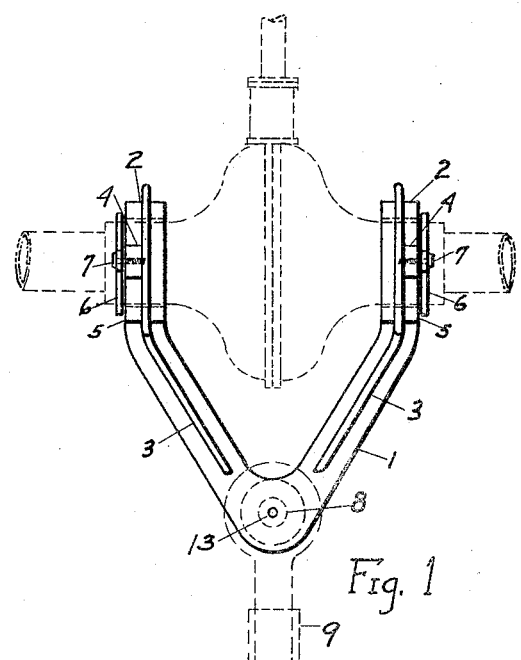
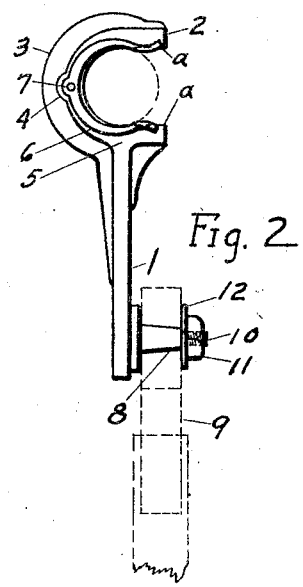
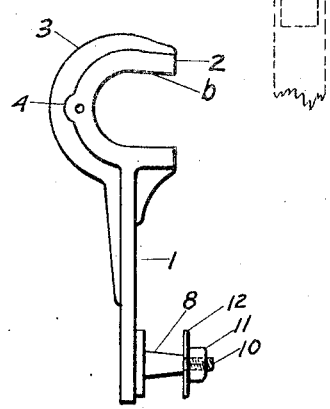
INVENTOR
Walter P Fleming
BY Myron J Dikeman
ATTORNEY Patented Feb. 16, 1926.

1,572,914

UNITED STATES PATENT OFFICE.

WALTER P. FLEMING, OF DETROIT, MICHIGAN.

DRIVE-AWAY TOWING FIXTURE.

Application filed May 11, 1925. Serial No. 29,452.

*To all whom it may concern:*

Be it known that I, WALTER P. FLEMING, a citizen of the United States of America, residing in the city of Detroit, county of Wayne, State of Michigan, have invented certain new and useful Improvements in a Drive-Away Towing Fixture, and declare the following to be a full, clear, and exact description of the same, such as will enable others skilled in the art to which it pertains to make and use the same, reference being had to the accompanying drawings, which form a part of these specifications.

The object of my invention is to produce a drive-away towing fixture for attaching to the center of the rear axle of an automobile, suitable for connecting a draw bar of a towing device, such as is now in common use for towing away cars.

Another object is to provide a towing device that will engage and attach to the gear housing section in the center of the rear axle of an automobile, without the use of bolts or other detachable means, and will provide a solid and permanent support for withstanding any load as may be applied thereto through the attached towing bar.

A further object is to produce a towing device that can be easily attached and detached from the axle of an automobile, by means of hooks and spring clips, and which will allow free movement of the attached towing bar in a vertical or horizontal direction.

A still further object is to produce a towing fixture that is simple in construction, easily and efficiently operated and that can be manufactured at a low cost.

These several objects are attained in the preferred form by the construction and arrangement of parts more fully hereinafter set forth.

Similar parts on all drawings are marked by similar numerals.

Fig. 1, is a plan view of my device illustrating the same as attached to the rear axle of an automobile.

Fig. 2, is a side view of the device showing the general construction of the frame, and the attached retaining clip.

Fig. 3, is an end view of the device as shown in Fig. 1.

Fig. 4, is an enlarged detail of the retaining clip.

Fig. 5, is a side view of the main casting with the spring retaining clip removed.

I will now describe more fully the detailed construction of my device referring to the drawings and the marks thereon.

The general construction of my towing fixture comprises a V-shaped frame, provided with U-sockets formed on both of the projecting ends thereof, said U-sockets being of a size and so positioned as to hook over the gear housing casing of an auto axle, and engaging thereon on the opposite sides of the said housing. The frame is provided with U-shaped retaining spring clips attached to the outside of each of the U-sockets, for engaging and gripping the said housing casings for holding the device thereon.

The frame —1— is made of case metal having sufficient strength for withstanding the strain of an attached load from a towing device, and is formed, preferably in a V-shape, having the outer ends arranged parallel with each other and of the same length. At the ends of the said frame —1— is formed U-sockets —2—, of a size and shape to engage and receive the ends of the axle gear housing casing, and so positioned that the frame —1— attaches thereto at about the center of the opening, and along the centerline of the engaging auto axle, for the purpose of applying the attached load from the towing device to the center of the automobile axle, preventing any torsion or twisting therein. The frame —1— being preferably formed with a flat bar, curved edgewise, for providing lateral strength therein to withstand angularly applied loads, and is reinforced by the vertical ribs —3— extending along the top face of the frame —1—, over and around the U-sockets —2—, greatly increasing the strength of the fixture with little added material. On the outside of both of the U-sockets —2—, on the top wall thereof, is formed a pivot boss —4—, extending from the face of the rib —3— to the outer face —5— of the U-sockets, and finished flush therewith. Attached to each of said pivot bosses —4—, is a spring retaining clip —6—, connected thereto by the pivots —7— which pass through the hole —8— of the clip and fixedly engaged within the boss —4—, so arranged that the clip —6— may adjust thereon. The clip —6— is made of spring metal, also formed in U-shape with an opening therein conforming in size and shape approximately to that of the U-sockets —2— to which they are attached, having the ends of said spring clip —6— extending below the center of the U-socket openings, and slightly closed together so as to require spreading of the spring ends when forced over the axle housing casings. The U-sockets —2— are to hook over the axle housing and having one of said U-sockets positioned on each side thereof, with the attached spring clips —6— engaging and gripping said axle housing for holding the device thereon. The U-sockets —2— may be formed with straight side walls —a— as shown in Fig. 2, or may be formed with a slightly curved wall —b— as shown in Fig. 5. The latter providing a more stable connection to the axle but is slightly more difficult to remove therefrom. The principle is the same in both. At the forward end of the frame —1—, in the V-portion thereof, is attached a tapered draw pin —8— fixedly attached to the frame, projecting downward from the bottom thereof and provided for receiving the draw bar —9— of an attached towing device. The outer end of the draw pin —8— is provided with a threaded stud —10—, projecting therefrom, with the engaging washer —12— and nut —11— for retaining the draw bar —9— thereon. If desired, the draw pin —8— as shown, may be omitted entirely and the frame —1— provided with a central hole —13—, as indicated in Fig. 1, for attaching a connecting clevis thereto, or some other similar device. However, the draw pin —8— is of the preferred form.

In attaching my device to the axle housing, it requires only to hook same over the axle casing, and the frame is retained thereon by the gripping of the spring clips —6—.

Having fully described my towing fixture, what I claim as my invention and desire to secure by Letters Patent is:

1. A towing fixture adapted for attaching a towing device to the rear axle housing of an automobile, comprising a V-shaped frame having both ends thereof the same length and parallel to each other, a U-socket formed on each end of said frame for hooking over the axle housing, spring clips attached to the U-sockets for holding same on the axle housing, and means for attaching a draw bar of a towing device to the opposite end of the frame.

2. A towing fixture adapted for attaching a towing device to the axle shaft housing of an automobile, comprising a V-shaped metal frame having its ends separated and arranged parallel with each other, a U-socket formed on each end of said frame for hooking over the axle shaft housing, said U-sockets positioned thereon so that said frame will lie in a plane near the center of the axle shaft housing, spring clips for retaining said U-sockets on the axle shaft housing, and means for attaching a draw bar of a towing device to said frame.

3. A towing fixture adapted for attaching a towing device to the rear axle shaft housing of an automobile, comprising a U-shaped metal frame, having its ends of equal length and separated to inclose the gear housing of the axle shaft, U-sockets formed on each end of said frame, positioned opposite and parallel with each other and for hooking over the axle shaft housing, said U-sockets so designed as to place the connecting frame in a plane near the center of the axle shaft to avoid transmitting a tortion load therein, a clip retainer spring attached to the side of each U-socket for engaging and gripping the axle shaft housing when the said U-sockets are hooked thereon, and means for attaching a draw bar of a towing device to the opposite end of said frame.

4. A towing fixture adapted for attaching a towing device to the rear axle housing of an automobile, comprising a U-shaped metal frame for partially inclosing the gear housing of the axle shaft, a U-socket formed on the ends of said frame for hooking over said axle shaft housing, said sockets being positioned opposite and parallel with each other and so as to bring the connecting frame in a plane near the center of the inclosed axle shaft housing, a U-shaped spring clip pivoted to one side of each of said U-sockets for engaging the axle shaft when the U-sockets are hooked thereon, and means for attaching a draw bar of a towing device to the opposite end of said frame near its center.

5. A towing fixture adapted for attaching a towing device to the rear axle shaft housing of an automobile, comprising a cast metal frame shaped similar to a letter U having its ends of equal length and parallel to each other, said ends being separated to partially inclose the gear housing of the axle shaft, U-sockets formed on each of the ends of said frame for hooking over the axle shaft housing, said U-sockets so designed and positioned as to place the connecting frame in a plane near the center of the axle shaft, rib means thereto for stiffening said metal frame and connected U-sockets, a U-shaped spring clip having the ends thereof slightly closed together pivoted to one side of each of the said U-sockets, said U-clips conforming approximately to the opening of the U-sockets and for engaging and gripping the axle shaft housing when the U-sockets are hooked thereon, a draw pin attached to the opposite end of said frame near the center thereof for connecting a draw bar of a towing device thereto, and means for retaining said draw bar on said draw pin.

In witness whereof I sign these specifications.

WALTER P. FLEMING.